United States Patent [19]
Gold

[11] Patent Number: 5,596,491
[45] Date of Patent: *Jan. 21, 1997

[54] HIGH VOLTAGE POWER SUPPLY FOR A HELMET MOUNTED DISPLAY DEVICE

[76] Inventor: Andrew L. Gold, 108 Burdon Lane, Cheam, Surrey, United Kingdom

[*] Notice: The term of this patent shall not extend beyond the expiration date of Pat. No. 5,473,527.

[21] Appl. No.: 563,968

[22] Filed: Nov. 29, 1995

Related U.S. Application Data

[63] Continuation of Ser. No. 350,730, Dec. 7, 1994, Pat. No. 5,473,527.

[30] Foreign Application Priority Data

Oct. 3, 1991 [GB] United Kingdom ............... 9120975
Oct. 31, 1991 [GB] United Kingdom ............... 9123145

[51] Int. Cl.$^6$ ........................ H02M 7/00; G09G 3/02
[52] U.S. Cl. ............................ 363/65; 345/8
[58] Field of Search ..................... 363/16, 20, 21, 363/24, 25, 59, 60, 65, 146; 315/3; 345/7, 8, 9, 211

[56] References Cited

U.S. PATENT DOCUMENTS

| | | | |
|---|---|---|---|
| 3,815,354 | 6/1974 | Strocka et al. | 348/84 |
| 4,878,046 | 11/1989 | Smith | 345/8 |
| 5,161,241 | 12/1992 | Kanai | 363/65 |
| 5,259,800 | 11/1993 | Fields | 455/61 |
| 5,272,612 | 12/1993 | Harada et al. | 363/45 |
| 5,343,313 | 8/1994 | Fergason | 345/8 |
| 5,408,393 | 4/1995 | Becker | 362/105 |
| 5,515,070 | 5/1996 | Kawada | 345/8 |

FOREIGN PATENT DOCUMENTS

| | | |
|---|---|---|
| 3607221A1 | 9/1987 | Germany . |
| 4037879A1 | 6/1991 | Germany . |
| 2238627 | 6/1991 | United Kingdom . |

OTHER PUBLICATIONS

Examination Report EPO Counterpart Application.

*Primary Examiner*—Matthew V. Nguyen
*Attorney, Agent, or Firm*— Watson Cole Stevens Davis, PLCC

[57] ABSTRACT

A power supply for providing, from a low voltage source, a high voltage supply for a display device comprises first and second physically separate modules and an electrical conductor therebetween. The first module is adapted to be connected to the low voltage source and contains circuitry operating at low voltage. The second module provides said high voltage supply and contains circuitry operating at high voltage. The electrical conductor between the two modules carries current only at low voltage. This arrangement permits safe disconnection of the power supply, for instance in emergency situations, by breaking the low voltage connection, rather than having to break a high voltage connection. A preferred use of the power supply is to provide a high voltage supply to a display device incorporated into a helmet.

7 Claims, 2 Drawing Sheets

HIGH VOLTAGE POWER SUPPLY FOR A HELMET MOUNTED DISPLAY DEVICE

This application is a continuation of Ser. No. 08/350,730 filed Dec. 7, 1994, now U.S. Pat. No. 5,473,527.

FIELD OF THE INVENTION

The present invention relates to high voltage power supplies and more particularly to portable high voltage power supplies which are suitable for use in powering display devices such as cathode ray tubes.

With the advent of small display devices has come the ability to create portable display units of considerable sophistication but this has brought with it the need for a portable power supply capable of providing the very high voltages which cathode ray devices normally require but which must usually be derived from a relatively low voltage source generally available. A typical example of one use of a portable cathode ray-type display device is the use of projected head-up displays as part of a helmet.

DESCRIPTION OF THE PRIOR ART

In order to reduce the weight of such a helmet, it has previously been proposed to fix the high voltage power supply at a convenient location and connect the helmet to the power supply by high voltage cables. This is unsafe particularly if the high voltage cable has to be disconnected in an emergency situation since an arc can be drawn during the disconnection process.

To increase safety it is therefore desirable that the cable which must be broken in an emergency as described above or as part of normal use be a low voltage cable. As a result, there have been proposals to make the complete power supply portable and carried by the person preferably as a small unit on the helmet. The cable to be broken would then be the connection to the low voltage source.

SUMMARY OF THE PRESENT INVENTION

We have considered the weight and size of a portable high voltage power supply and come to the view that while such a device could technically be produced its weight and size would render it unsuitable for inclusion in a helmet.

From a first aspect the present invention provides a helmet including a display device arranged to provide information to the wearer of the helmet, the display device being supplied by a high voltage generated by a power supply from a low voltage source;

the power supply comprising first and second physically separate modules and an electrical conductor therebetween, wherein the first module is adapted to be connected to said low voltage source and contains circuitry operating at low voltage, the second module provides said high voltage supply and contains circuitry operating at high voltage, and the electrical conductor between the two modules carries current only at low voltage.

From a second aspect the present invention provides a power supply for providing, from a low voltage source, a high voltage supply for a display device comprising first and second physically separate modules and an electrical conductor therebetween, wherein the first module is adapted to be connected to said low voltage source and contains circuitry operating at low voltage, the second module provides said high voltage supply and contains circuitry operating at high voltage, and the electrical conductor between the two modules carries current only at low voltage.

It is known that in a high voltage power supply operating from, for example, a low voltage DC source, the first stage in the power supply may comprise switching means. These provide low voltage switched oscillating signals which are utilized by voltage multipliers etc. to generate the high voltages. The present invention may therefore be implemented as an arrangement in which the low voltage module includes the switching means and the electrical connection carries the switched or oscillating signals to the high voltage module which includes the voltage multipliers etc. to generate the required high voltage.

It will be appreciated from the above that in the context of this application the term 'high voltage' means a voltage which would cause a potentially dangerous arc or spark if disconnection were made at that voltage. Complementarily 'low voltage' means a voltage which may be safely disconnected. Thus the boundary between high and low voltages may be environmentally dependent, and also may be defined by safety regulations for a particular application.

The use of two modular components in a helmet supply as above results in a considerable reduction in the size and weight of the component which needs to be mounted on the helmet. Only the high voltage module must be located on or near the user or mounted on a helmet. The low voltage part of the power supply can be provided at any suitable location either fixed to a vehicle, boat or aircraft or even attached to the body of the user.

The link which must be disconnected for removal of the display from the low voltage source or in an emergency situation is therefore either the conductor between the two modular components or the supply to the low voltage module. Both of these are low voltage connections and therefore disconnection can be safely achieved.

In order that the present invention be more readily understood an embodiment thereof will now be described by way of example with reference to the accompanying drawings in which:

DETAILED DESCRIPTION OF THE PREFERRED EMBODIMENT

Figure 1:
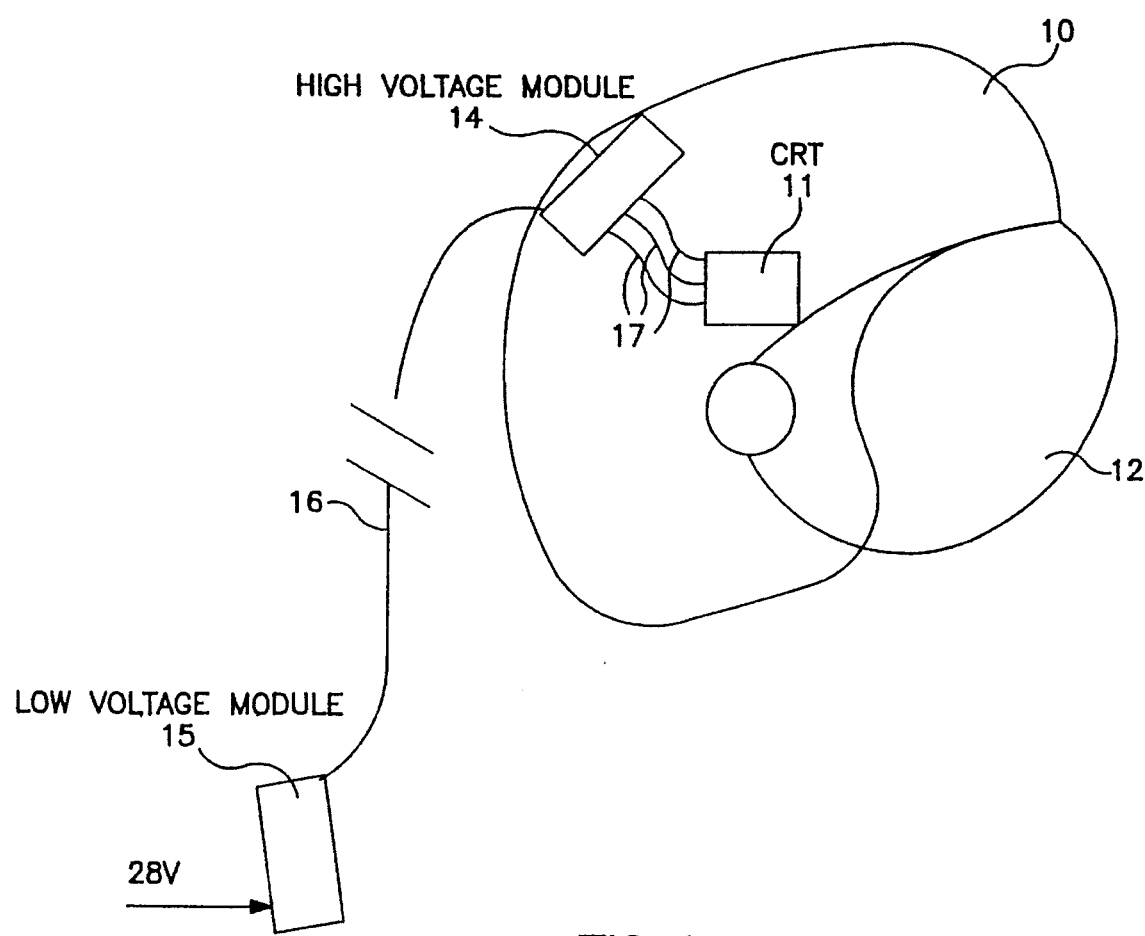
FIG. 1 shows a block diagram of one form of a portable high voltage power supply according to the present invention.

The present invention will be described in relation to its use in a helmet 10 where a display is generated by a display device such as a cathode ray tube 11 and projected onto a visor 12, as illustrated in FIG. 1. The power supply to the display device 11 is, according to the present invention, constructed as two separate modules namely a high voltage module 14 and a low voltage module 15 which is located at some suitable position physically separated from the helmet 10. The power supply is designed for low power e.g. of the order of 12W or less but very high voltage e.g. of the order of kilovolts.

The low voltage power supply module 15 is provided with a voltage supply such as a 28 volt DC input which can be produced from a vehicle. The low voltage module 15 is then arranged to produce a suitable oscillating signal still at low voltage for conversion to a very high voltage such as is needed by the display device 11. The low voltage module 15 will utilize a suitable circuit, such as a push-pull circuit to provide an oscillating signal at high frequencies but still at low voltage at its output. The output of the low voltage module 15 is connected to the input of the high voltage module by way of a cable 16. At the input of the high voltage unit, the low voltage supplied from the cable 16 is multiplied in some convenient manner e.g by the use of a transformer and voltage multiplication networks in order to provide one or more high voltage outputs on conductors 17 which connect the high voltage module to the display device 11.

The power supply of this invention may be provided as two separate modules and a flexible cable. The output from the low voltage module may be connected to the cable via a plug/socket connector, and the cable may be similarly connected to the high voltage module via a plug/socket connector.

In use, if the user wishes to disconnect his helmet from the power supply quickly, all that need be done is the cable can be disconnected from either the low voltage module 15 or the high voltage module 14 in view of the fact that both ends of the cable are at low voltage. Alternatively, the cable can be in two parts with a releasable connection for instance a plug/socket connector at some position along the cable. While there is no need to provide spark suppression circuitry, such circuitry can be incorporated in any circumstances when it is thought appropriate since low voltage spark suppression circuitry is inexpensive, reliable and uncomplicated.

If desired, the power supply can be a stabilized power supply in which case a feedback connection has to be provided from the high voltage unit 14 to the low voltage module 15 via the cable 16.

While the above embodiment discloses a low voltage module 15 supplied with 28 V DC input, it is also possible to utilize other inputs such as other DC inputs or AC inputs such as a 115 V AC input with consequent changes to the circuitry contained with the low voltage module 15.

The high voltage module may be arranged to provide one or more high voltage outputs. These may for instance provide voltages up to, or above, 13 kV. Embodiments may be provided which provide one or more preset output voltages, as well as one or more adjustable voltage outputs.

Figure 2:
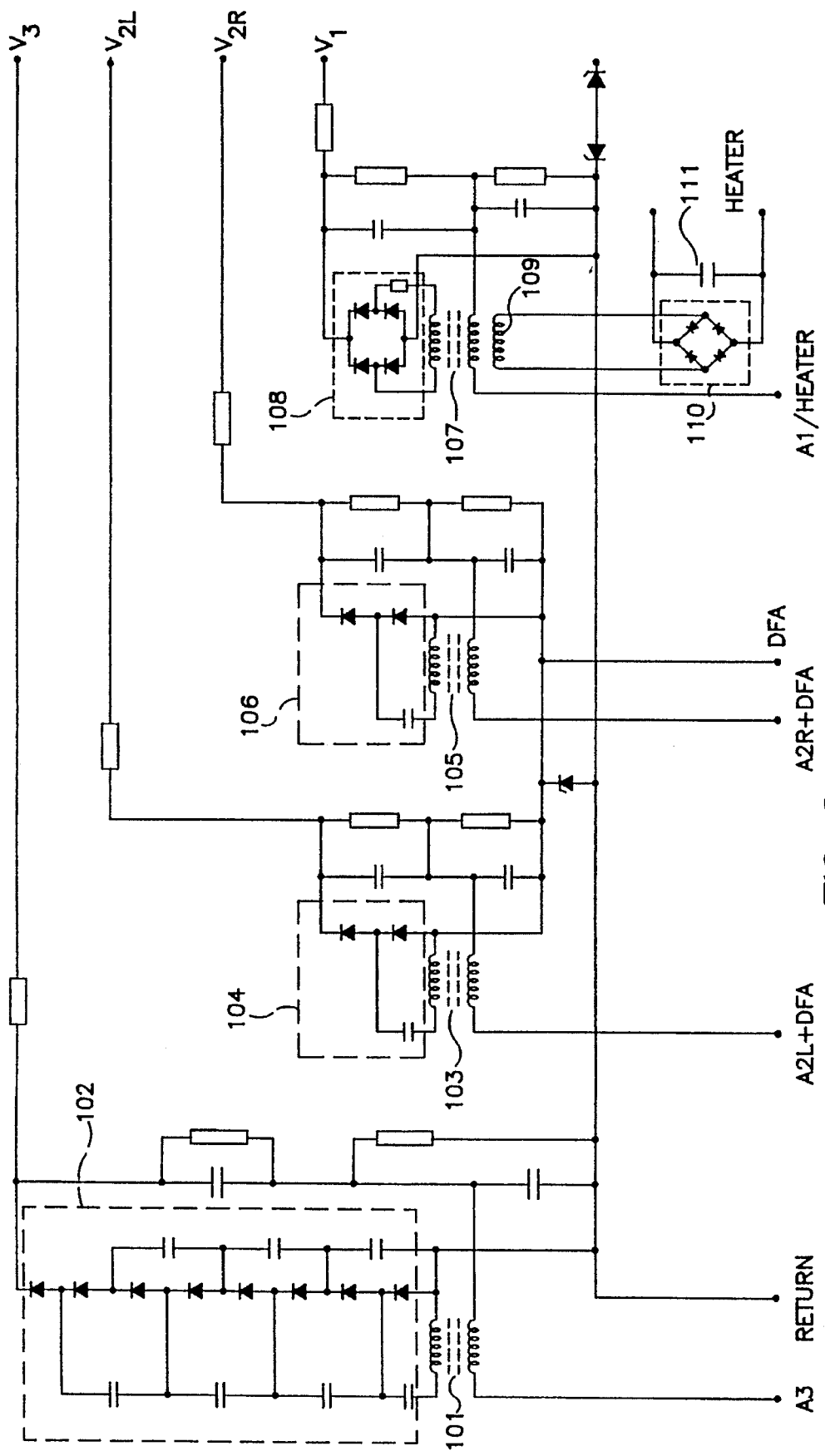
FIG. 2 shows a circuit diagram of a preferred embodiment of the high voltage module of the present invention.

FIG. 2 shows a preferred embodiment of the high voltage module. As is apparent from this figure, it is only necessary to provide circuitry comprising a relatively small number of diodes, resistances, capacitances and inductances in the high voltage module. This provides a considerable reduction in weight for this high voltage module as compared to a complete high voltage power supply.

A preferred embodiment of the low voltage module is not shown in detail as the exact constructional details of this module are not essential to the invention. It is necessary for the low voltage module to provide the low voltage oscillating signals needed by the high voltage module to generate the high voltage supplies, and to generate any further signals required for a particular application. It will be clear to a skilled man how the generation of such signals may be achieved.

In FIG. 2 the inputs from the low voltage module are shown as A3, A2L+DFA, A2R+DFA, A1/Heater, DFA and Return. This embodiment therefore requires that the link between the two modules is 6-wire cable. The term 'DFA' refers to a signal from a Dynamic Focus Amplifier which may be provided for control of the Cathode Ray Tube display which this embodiment is designed to supply. The operation of this will not be described in detail as it is not directly relevant to the invention. The return link simply provides the ground connection to the high voltage module. A1 . . . A3 are oscillating signals provided by the low voltage module at a low voltage which are converted by the high voltage module into high voltage DC supplies.

Input A3, which is a low voltage oscillating signal, preferably a square wave, is applied to the primary winding of transformer 101. In the preferred embodiment the primary to secondary winding ratio of transformer 101 is 23:1800. Thus transformer 101 provides at its secondary winding a higher voltage oscillating signal. The diode/resistor ladder 102 steps up the voltage of the signal provided from the secondary winding of transformer 101 and provides a high voltage DC output $V_3$. In the preferred embodiment output $V_3$ is a 13 kV, 200 µA supply. The further resistors and capacitances associated with transformer 101 and ladder 102 act to filter and smooth the $V_3$ output.

Inputs A2L+DFA and A2R+DFA are used in very similar ways to input A3. These signals are applied to the primary windings of transformers 103 and 105 respectively. These transformers also have a preferred primary to secondary winding ratio of 23:1800, and the secondary voltages are applied to ladders 104 and 106 respectively. These are similar to ladder 102 except that they are smaller and do not generate voltage outputs as high. Outputs $V_{2L}$ and $V_{2R}$ are, in the preferred arrangement, 2.6 kV, 220 µA outputs.

Input A1/heater is used in a similar way to the inputs discussed above to produce output $V_1$ via transformer 107 and diode/resistor arrangement 108. Output $V_1$ is preferably a 1 kV, 20 µA output. Additionally, a further secondary winding 109 may be provided in transformer 107. The oscillating output from this winding is used, rectified and smoothed by diodes 110 and capacitance 111, to drive a heater in the display device.

The cable connecting the two modules in different implementations of the invention may comprise various numbers of separate wires carrying different signals. For instance in addition to the oscillating signal or signals provided by the low voltage module the cable may carry control signals and a ground connection as in the embodiment described above and if required the feedback connection mentioned above. These would also be low voltage signals and therefore could be safely broken.

Although the invention has been described in relation to its use in a helmet with the high voltage module as part of the helmet, the high voltage module can be located at any convenient site. What is important is that any emergency disconnection is achieved at the low voltage side and this may include disconnection of the supply to the low voltage module.

The size and weight of the high voltage module is such that it could be conceived as part of a connected system so that the module would become an in-line connector in which case the wires, particularly on the high voltage output side would preferably be strain relieved in some way.

I claim:

1. A helmet mounted display system comprising:
   a helmet including an electrically powered display device for providing information to the wearer of the helmet, the display device being supplied by a high voltage generated by a power supply from a low voltage source;

the power supply comprising first and second physically separate modules and an electrical conductor therebetween, wherein the first module is connectable to said low voltage source and contains circuitry operating at low voltage;

the second module provides said high voltage supply and contains circuitry operating at high voltage and the second module is electrically connected to the display device to provide a high voltage to the display device; and said electrical conductor extends between the two modules and carries current only at low voltage.

2. A helmet mounted display system according to claim 1, in which said first module generates a low voltage oscillating signal which is input to said second module via said electrical conductor, the second module being responsive to said low voltage oscillating signal to generate said high voltage supply.

3. A helmet mounted display device according to claim 2, in which said second module comprises a transformer and a voltage multiplication network.

4. A helmet mounted display system according to claim 1, in which said electrical conductor is a flexible electrical cable.

5. A helmet mounted display system according to claim 1, further comprising a DC voltage source in the range of 22 to 35 volts and the power supply is connectable to said DC voltage source.

6. A helmet mounted display system according to claim 1, in which the power supply provides a high voltage supply in the range of 6 to 13 kV.

7. A helmet mounted display system according to claim 1, wherein the second module is mounted on, or incorporated into, the helmet.

* * * * *